US009693233B2

(12) United States Patent
Ward et al.

(10) Patent No.: US 9,693,233 B2
(45) Date of Patent: Jun. 27, 2017

(54) INTELLIGENT AGENT FOR PRIVACY AND SECURITY APPLICATION (71) Applicant: Location Sentry Corp, Camas, WA (US)

(72) Inventors: Matthew L. Ward, Collegeville, PA (US); Craig E. Spiegelberg, Washougal, WA (US)

(73) Assignee: Location Sentry Corp., Camas, WA (US)

( * ) Notice: Subject to any disclaimer, the term of this patent is extended or adjusted under 35 U.S.C. 154(b) by 0 days.

(21) Appl. No.: 15/091,430

(22) Filed: Apr. 5, 2016

(65) Prior Publication Data

US 2016/0219438 A1 Jul. 28, 2016

Related U.S. Application Data (63) Continuation-in-part of application No. 14/207,417, filed on Mar. 12, 2014, now abandoned.

(60) Provisional application No. 61/851,764, filed on Mar. 13, 2013.

(51) Int. Cl.
*H04L 29/00* (2006.01)
*H04W 12/08* (2009.01)
*H04W 12/12* (2009.01)
*H04L 29/06* (2006.01)

(52) U.S. Cl.
CPC ........... *H04W 12/08* (2013.01); *H04W 12/12* (2013.01); *H04L 63/145* (2013.01)

(58) Field of Classification Search
CPC ...... H04W 12/08; H04W 12/12; H04L 63/145
See application file for complete search history.

(56) References Cited

U.S. PATENT DOCUMENTS

| 6,446,048 | B1* | 9/2002 | Wells | G06Q 20/102 |
| | | | | 705/35 |
| 7,729,959 | B1* | 6/2010 | Wells | G06Q 20/102 |
| | | | | 705/30 |
| 9,185,095 | B1* | 11/2015 | Moritz | H04L 63/08 |
| 2005/0188215 | A1* | 8/2005 | Shulman | H04L 63/1416 |
| | | | | 713/188 |
| 2011/0307354 | A1* | 12/2011 | Erman | G06F 8/60 |
| | | | | 705/27.1 |
| 2012/0151033 | A1* | 6/2012 | Baliga | H04L 63/1425 |
| | | | | 709/224 |
| 2013/0275736 | A1* | 10/2013 | Kelley | G01D 4/004 |
| | | | | 713/1 |

* cited by examiner

*Primary Examiner* — Don Zhao (57) ABSTRACT

A system and method are provided for use with a mobile device. The system is configurable to detect unauthorized access to onboard sensors or information developed by the sensors or configured by the user. Upon detection, access may be denied or limited according to pre-set rules or user intervention. The rules may consider prior access attempts, time-of-day or current location in the denial or limitation of access. Access limitation can include limiting access to only dithered data or spoofed data in accordance to the rules or user instructions.

17 Claims, 8 Drawing Sheets

INTELLIGENT AGENT FOR PRIVACY AND SECURITY APPLICATION

CROSS-REFERENCE TO RELATED APPLICATIONS

This application is a continuation-in-part of U.S. application Ser. No. 14/207,417 filed Mar. 12, 2014, currently pending, which claims priority to U.S. Provisional Application Ser. No. 61/851,764 filed on Mar. 13, 2013, titled INTELLIGENT AGENT FOR PRIVACY AND SECURITY by WARD, Matthew L. et al., the entire disclosure of both which are incorporated herein by reference.

BACKGROUND OF THE INVENTION

With the explosive growth in mobile devices, wireless data rates and mobile-based software applications (aka "apps"), the security and privacy needs of the user of wireless devices such as smartphones, tablet computers, and wireless LAN-equipped netbooks, laptop portable computers or voice-over-IP phones with nomadic capabilities have been overlooked.

In the rush to establish and gain market share, device manufacturers modified existing operating systems (e.g. UNIX, LINUX, Microsoft Windows, POSIX, NeXT, BSD) and added hardware subsystems and sensors (e.g. cameras, accelerometers, GPS receivers, infrared transceivers, Wi-Fi transceivers, Bluetooth transceivers, and digital signal processors) without due consideration to the unique security and privacy situation of a device as private and personal as a wireless device.

The existing security models of the operating systems were designed to preserve system integrity and data integrity, but not designed with the mobility and network access inherent in wireless devices. As such the existing separation of the operating system for user-level applications and the sandboxing of application from each other do not prevent leakage of private information from the wireless device. The present Operating System (OS) security model provides ample opportunity for the infiltration of mal-ware and virus-like applications. Also, the OS security model provides no protection against commercial leakage of private data by carriers, App providers, Operating System makers or OEMs intent on selling or using customer private data or infiltration of malware at the OS maker, carrier, or OEM levels.

As can be seen, the simplistic, all- or nothing security settings of wireless devices and the narrow legislation that provides penalties for only the most egregious offenders (if the identity of the offender can ever be discovered), are a poor substitute for active user control of the formation and dissemination of personal information. For example, the "Location Privacy Protection Act of 2011" (Senate bill. 1223) was a narrowly-tailored location-only bill that would require any company that may obtain a customer's location information via smartphone or other mobile device to get that customer's express consent before obtaining and sharing, selling or renting location data. The bill also would create focused criminal penalties for the worst abusers of location technology, including the knowing and intentional use of so-called "stalking apps" to violate federal anti-stalking and domestic violence laws.

Therefore what is needed is a system and method for enhanced security and privacy of a device to protect a user, which applies to operating systems, including; Android, iOS, Windows Mobile, Blackberry, Symbian, PalmOS, Firefox OS and Ubuntu Mobile/Ubuntu for devices. The Android-based model discussed is an exemplary but not exclusive environment in which the present invention may be used.

SUMMARY OF THE INVENTION

In accordance with the various aspects and teachings of the present invention, a system and method are provided that enhance security and privacy. For example, an Android-based model is discussed as an exemplary but not exclusive environment, in which the various aspects of the present invention may be implemented. In accordance with the various aspects and teachings of the present invention, use of an intelligent agent application on a wireless device allows automatic, customizable, and personal control over the services provided by the wireless device and data generated by those services. Use of this agent provides local or remote control of device services and individualized limitations on user-level applications. The limitations can range from a simple prohibition on access to a service to complex access rules where individual applications and processes are granted rights based on the device's knowledge of at least one of: time-of-day, current location, user settings, remotely set rules and global prohibitions.

The foregoing is a summary and thus includes, by necessity, simplifications, generalizations and omissions of detail. Those skilled in the art will appreciate that the summary is illustrative only and is not intended to be in any way limiting.

BRIEF DESCRIPTION OF THE DRAWINGS

The foregoing summary as well as the following detailed description is better understood when read in conjunction with the appended drawings. For the purpose of illustrating the invention, there is shown in the drawings exemplary constructions of the invention; however, the invention is not limited to the specific various aspects, embodiments, methods and instrumentalities disclosed. In the drawings.

DETAILED DESCRIPTION OF ILLUSTRATIVE EMBODIMENTS

For instance, the popular Android system assigns application access privileges only at installation. In normal operation, if an app is being installed, a list of desired access privileges is displayed to the user. As stated in the Android Security Overview;

"If the user continues with the app installation, the system accepts that the user has granted all of the requested permissions. The user can not grant or deny individual permissions—the user must grant or deny all of the requested permissions as a block. Once granted, the permissions are applied to the application as long as it is installed. To avoid user confusion, the system does not notify the user again of the permissions granted to the application, and applications that are included in the core operating system or bundled by an OEM do not request permissions from the user. Permissions are removed if an application is uninstalled, so a subsequent re-installation will again result in display of permissions."

Of course, even this level of user security and awareness is moot if a malicious application such as a virus installs itself, or for those applications pre-loaded on the wireless device that the user never installs and cannot uninstall. The ease of social engineering or exploitation of user ignorance with such a one-time-shot security warning also cannot be underestimated in light of historical hacking and cracking of computer systems.

Of course, a knowledgeable user can prevent application access to information by turning off basic services. Again, from the ANDROID Security Overview:

"Within the device settings, users are able to view permissions for applications they have previously installed. Users can also turn off some functionality globally when they choose, such as disabling GPS, radio, or wi-fi."

So security can be enforced by disabling basic functionality, crippling not only the suspect application, but all legitimate, desired applications that use that function. Also, experience has shown that turning on disabled functionality from within a specific application's user dialogue enables that functionality for all applications until globally disabled again.

Many, if not all, applications ask for access privileges far in excess of any rational use. For example, one popular mapping and turn-by-turn navigation app requires the user to grant permissions for continual access to the following data that is largely created above the kernel and device driver level. A summary of these permissions can be seen in Table 1.

TABLE 1 access call history
read/write phone contacts list
read/write external storage/sdcard
access near-field communications facilities
manage/use account credentials
install shortcut (can place a link on your home screen)
disable keyguard
record audio
access network state (i.e. verify that you have an internet connection)
read-only permission to instant messaging facilities
access & change WI-FI state
access fine location information
access coarse location information
read phone state (i.e. see that you're on the phone or not)
access wake lock
make phone vibrate TABLE 1-continued monitor internet access/connectivity
knows if phone has completed booting (device state/status)
place a phone call While an advancement on the location security offered by mobile operating systems such as Android, Apple's IOS, Symbian, or the Blackberry OS, was introduced in "Unauthorized Location Detection and Countermeasures", (U.S. patent application Ser. No. 12/976,908; filed Dec. 22, 2010) a more complete security offering is needed to maximize device functionality while controlling and minimizing access to all device-produced data. Not only is the detection of a security leak required, but the appropriate response either pre-set or one inviting user interaction is required.

In accordance with the various aspects and teachings of the present invention a wireless devices is a device that includes at least one the features of: 1) capable of communication in a network, with a network, or as part of a network; 2) capable of being programmed and/or reprogrammed; and 3) capable of sensing to gather information. Such wireless devices have changed in both operation and form-factors, converging the personal computer (PC) with the cellular phone and other communications devices.

Besides communications functions (e.g. Voice Telephony, Short-message-service (SMS), Multi-media Messaging Service (MMS), TCP/IP data connectivity) and upgraded general processing power, sensors have been added to the wireless device. For instance, a wireless device (e.g. a smartphone, feature phone, netbook, Personal Digital assistant (PDA), tablet computer or PC with wireless LAN capability) can include:
 Camera/Video functions
 Location data (Satellite-based)
 Location data (Mobile-based)
 Location data (Network-based)
 Motion data (e.g. compass, accelerometer)
 Capacitive Sensors
 Address Book, Contacts lists, recent called/emailed data.
 Application specific sensing, reading and monitoring capabilities The wireless device can also have multiple networking capabilities including nomadic wired tethering, local-area-network transceivers (e.g. IEEE802 Wi-Fi), wide-area-network transceivers (IEEE 802.16 WiMAN/WiMAX, cellular data transceivers, (e.g. LTE) and short-range, data-only wireless protocols such as Ultra-wide-band (UWB), Bluetooth, RFID, Near-field-communications (NFC), etc.

Wireless devices that can use and benefit from customizable access security include smartphones, feature phones, netbooks, Personal Digital assistants (PDAs), tablet computers or PCs with wireless WAN or LAN capability. All are reprogrammable devices that may be updated by the wireless operator, the user, or the owner in cases of a Mobile Device Management system (MDM) controlled device.

In accordance with one aspect of the present invention, any reprogrammable, networkable computing device with remote sensing capability, including those embedded in cars, thermostats, medical devices, and household appliances, benefits from customizable access security.

In accordance with the various aspects and teachings of the present invention, a system is disclosed that allows the wireless device's user (or owner) to determine at least of one or a combination of the following parameters:
 Which on-board applications are allowed access.
 When access is allowed by on-board applications.

When remote or local control of access by on-board applications is allowed.

Where in geophysical space is access by on-board applications allowed.

How much access or access to what subsystems is allowed to on-board applications.

Where in address space is interconnected access to on-board applications allowed.

The following terms (Table 2) are used in the profile for each secured application. Each secured application shall also have an associated rule for maximum flexibly in access control.

TABLE 2

| | |
|---|---|
| Blocked | The application has no rights to access secured interfaces or data |
| Dithered | The application has limited rights to access secured interfaces or data. Any data allowed will be winnowed to present a minimally acceptable result. For example, precise location data may be randomized by adding a random offset to the developed data. |
| Default | The application has limited rights to access secured interfaces or data in that a pre-set response will always be delivered, allowing the program to function, but giving away no information. One example is the setting of a default address or latitude and longitude for location. |
| Spoofed | The application has no rights to access secured interfaces or data. Deliberately false information, either, calculated or pre-set, will be delivered to the application (e.g. false location, false contact information, false call history, false external memory download, false status or state information) |
| Allowed | The application has rights to access secured interfaces and/or data. The allowance may be still be conditional on user input or subject to a time window where access is temporarily granted. |

Figure 1:
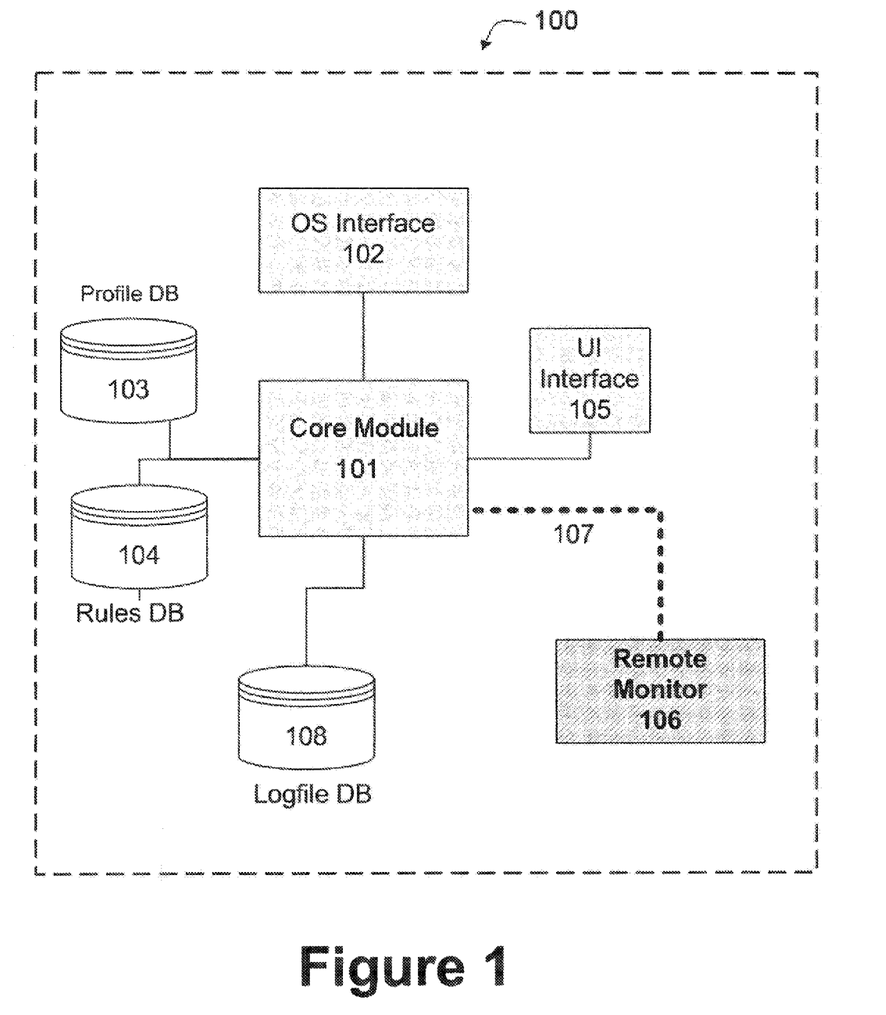
FIG. 1 shows the functional elements of a system in accordance with the various aspects and teachings of the present invention.

Referring now to FIG. 1, a system 100 is disclosed in accordance with the various aspects and embodiments of the present invention. The system 100 includes any combination of: a core module 101, an Operating System (OS) interface 102, a profile database 103, a rules database 104, a User Interface (UI) or interface 105, a remote interface 107 to a remote monitor 106, and a logfile(s) database 108. In accordance with some aspects and embodiments of the system 100, the remote interface 107 and remote monitor 106 may be excluded. In accordance with further aspects of the system 100, the interface 105 to the device's UI may be omitted. In accordance with other aspects and embodiments of the present invention, a user interface, as used herein, can include a display that is part of a mobile device, as disclosed herein. Furthermore, in accordance with other aspects and embodiments of the present invention, a user interface may be a display that is part of the remote monitor 106. Also, in accordance with further aspects and embodiments of the present invention, a user interface may be a display that is part of a computer being used by a user and different from the remote monitor 106.

In accordance with some aspects and embodiments of the present invention, the core module 101 manages the various subsystems. In addition to basic file control and interface traffic management, the core module 101 also includes the detection capability for secure access control and the code stored in memory or the logic to implement, both, the actions required by the profile and rules as well as interactions with the device and OS services (e.g. requesting subsystem state information, current location or time-of-day).

In accordance with some aspects and embodiments of the system 100, logging and reporting functions to are controlled by the core module 101. The various options for the OS interface 102 were taught in detail in the prior filing "Unauthorized Location Detection and Countermeasures" (U.S. patent application Ser. No. 12/976,908; filed Dec. 22, 2010). The OS interface 102 allows the system's application(s) (the system 100 includes one or more applications used to deliver the individual access controls offered) to interface with the mobile device's OS or to mimic, override, replace or supplant and existing programmic interface (often called "API", this is a protocol or interface used by software components, such as the operating system and an application, to communicate with each other).]

In accordance with some aspects and embodiments of the present invention, the system 100 includes two databases: the profile database 103 and the rules database 104. The profile database 103 includes the prohibitions and restrictions for each individual application. The profile database 103 includes application identifiers and actions for each access by the listed applications.

In accordance with some aspects and embodiments of the present invention, the rules database 104 includes the conditional access parameters for applications (e.g. time-of-day, current location). The rules database 104 also includes the verification routines to detect activation/deactivation sequences unique to malware attacks. The rules database 104 includes the logic and settings to implement the actions required by the Profile as well as actions pre-set to preserve program integrity. Both databases can be updated via the UI 105 or the remote monitor 106 if implemented.

In accordance with at least one aspect of the present invention, one deployment option for the system 100 is to start after installation with a default configuration prohibiting all access to secured data and services by any app and then build the profile database 103 and the rules database 104 from the user's selections of access rights for each application and each secured service.

If the remote monitor 106 is implemented for an instance of the system 100 application, then a datalink 107 will be established permanently, ad Hoc, or periodically to link the core module 101 and the remote monitor 106.

The UI 105 is an optional interface with the display(s), speaker(s) and tactile transducer(s) available on the mobile device for communicating with the user. The UI 105 allows the user to view logfiles and view and modify database settings such as the profile database 103 and the rules database 104. The UI 105 also allows the core module 101 to alert the user as set and defined in the rules database 104.

The remote monitor 106 and the remote interface 107 allow off-device program control and logging and notification duplicative of the capabilities of the UI 105. The remote monitor 106 and the remote interface 107 may be implemented as part of a Mobile Device Management (MDM) system.

In accordance with some aspects and embodiments of the present invention, the logfile database 108 allows on-device storage of program status, handled access events, errors, changelogs for the Profile, Rules. The logfile DB 108 may be overwritten or deleted by the user or downloaded and deleted by the remote monitor 106.

In accordance with some aspects and embodiments of the present invention, the system 100 provides an intelligent agent which uses a rules database with triggering events, periodic scans and mobile device state awareness. The system 100's intelligent agent app works within a pre-set rule set. It manages the information to the mobile device by preventing access to system resources (e.g. APIs) in accordance to the rules set. For example, application access may be limited by area (geophysical, arbitrary polygon, geopolitical/legal boundary), it may be limited by time-of-day, it may be limited by the identity of the requesting application, it may be limited by source of request or type (periodic/scheduled/triggered/immediate)) of request.

In accordance with some aspects and embodiments of the present invention, the following are examples of the system 100 in action.

B.1 Who—which Application is Requesting?

Example: A request is made from off device (TCP/IP address) activating an app that attempts to access the camera. Based on the settings and rules for the app, and optionally additional checks on other device settings; for instance, has the camera click or "video on" indicator been disabled, the system 100 will allow or deny the camera activation.

B.2 What—is the Action an Allowed Action?

Example: An application requests last SMS message contents sent Based on the settings and rules for the app, the system 100 will allow or deny the access to the last SMS. Such a prohibition can be made a default setting in the rules set requiring user intervention (either local or remote) to override.

B.3 When—is the Action Allowed at the Current Time? \

Example: An application requests your current location outside of normal business hours. Based on the settings and rules for the app, in this case a timecard app not allowed to determine location outside the set business hours, the system 100 will deny the access to current location.

B.4 Where—is the Action Allowed at the Current Location?

Example: A coupon application requests your location while you're out of the country. Based on the settings and rules for the app, and optionally additional checks on the current location or the wireless network identity, the system 100 will deny the request.

Alternative example: A photo album app requests your current location for geo-tagging. Based on the settings (e.g. geographical boundaries and time restrictions) and rules for the app, and optionally additional checks on the current location other device settings; for instance, has the camera click or "video on" indicator been disabled, the system 100 will allow or deny the camera activation.

B.5 What—is the Action(s) Allowed for the Current App?

Example: A free mileage calculator application requests your location, access to your camera and your accelerometer. The system 100 can be set to default to all access to secured services and data denied or may be set by the user to allow, limit, deny, or spoof for each or all of the requested accesses.

B.6 How Long—to Granted Access Permissions Expire?

Example: An certain App, at installation, asks for multiple permissions including: access to call history, read/write permission to contacts, read/write permission to external storage, permission to manage your account credentials, permission to record audio, permission to read test messages, permission to place a phone call, permission for location, permission for camera.

Using the system 100. The user can set a default allow, limit, deny, or spoofing for any app access. The user can reset access permissions away from the previous default for a temporary duration, granting access only for a limited time.

B.7 Has this Happened Before?

Example: An App has been blocked from access using the default, denied, or spoofed access. The app will be blocked from access for each and every subsequent attempt unless overridden by the user. Once the access has been allowed, a rule will be written, prompting the user duration of the access grant. If not a permanent election, the system 100 will query the user each time the App requests access in the future.

B.8 Are there a Series of Access Attempts Indicative of Illicit Behavior?

Example: An app requests access to the device's microphone. A vulnerability of VoIP (soon to be implemented as VoLTE on mobile devices) is remotely turning on the microphone turning the Mobile Device into a remote listening device. By linking the request for microphone access to a request for access to the data transmission capabilities of the device (especially when the required level of service request matches "voice"), the system 100 can actively prevent such illicit access.

B.9 Where is the Request Coming from or where is the Data Going to?

Example: An app receives a data stream from an off-device source. The app then proceeds to ask for access to a number of secured interface and/or secured data. The system 100 can prevent access and note the address of the off-device source.

Example: An app asks for access to a number of secured interface and/or secured data and then attempts to connect to an off-device destination. The system 100 can supply spoofed information for each access and note the address of the off-device destination.

Figure 2A:
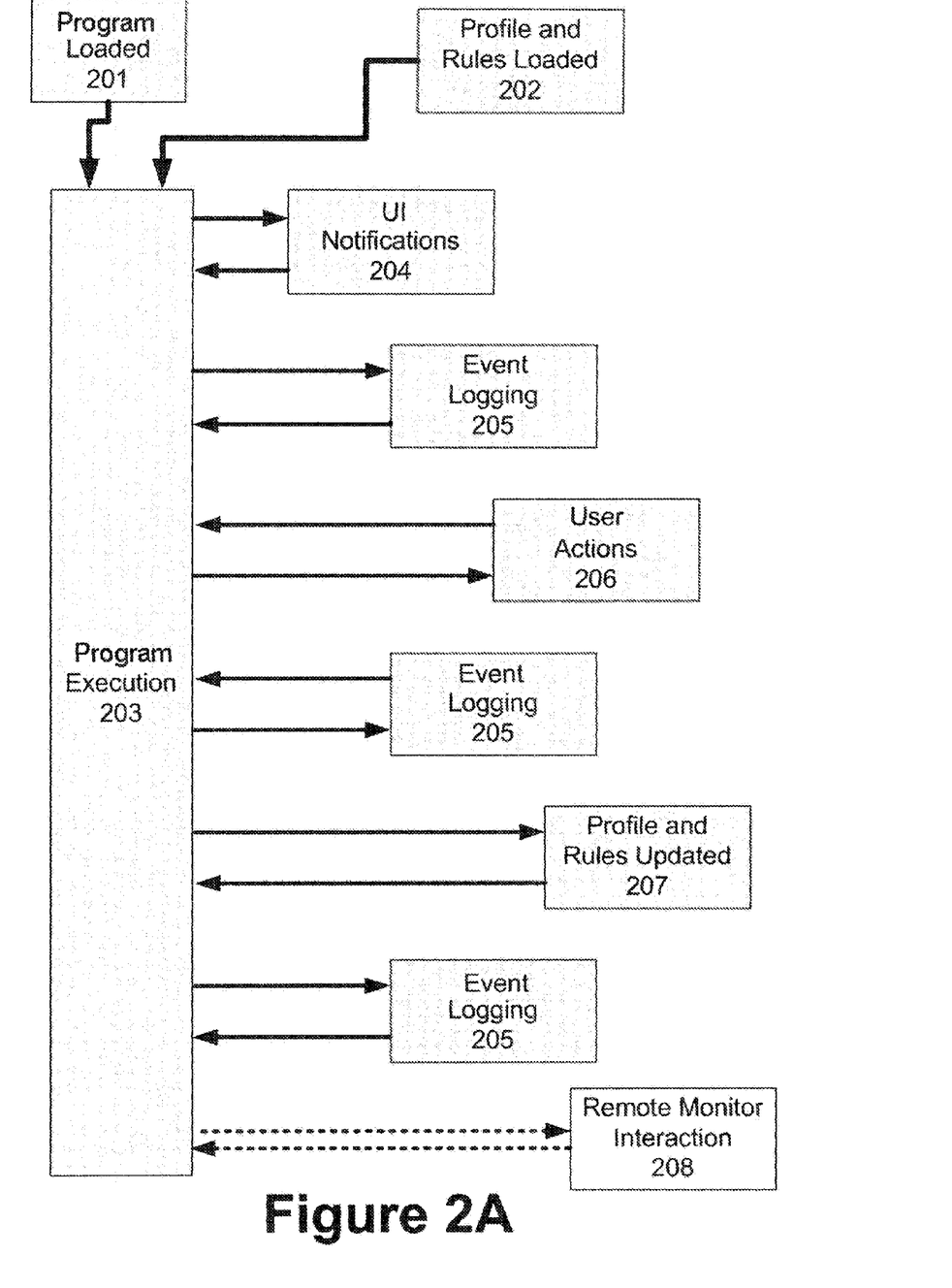
FIG. 2A shows the operations of a system in accordance with the various aspects and teachings of the present invention.

Referring now to FIG. 2A, an operation flow process is showing for the system 100, in accordance with the various aspects and embodiments of the present invention. At step 201, the program is loaded on the device and the Initial Profile and Rules set are loaded at step 202. The program executes at step 203, providing access security to personal information and device-based services. At some time during execution, a controlled event occurs, the program then uses the UI 105 to notify the user at step 204 and provide event logs at step 205. The user responds to the notification at step 206 and selects an action (e.g. always block this application from the camera during working hours and never notify). The program executes, at step 203, by writing the user selection, at step 205, and the resulting access control to the logfile at step 205. The program executes, at step 203, and updates the profile and rules databases, at step 207, with the user selected actions. The successful database update is then logged, at step 205, and the program continues to execute, at step 203.

In accordance with another aspect of the present invention, the remote monitor 106 is set to receive a periodic (e.g. daily) update, at step 208, of the logfile contents and then the program continues to execute, at step 203.

Figure 2B:
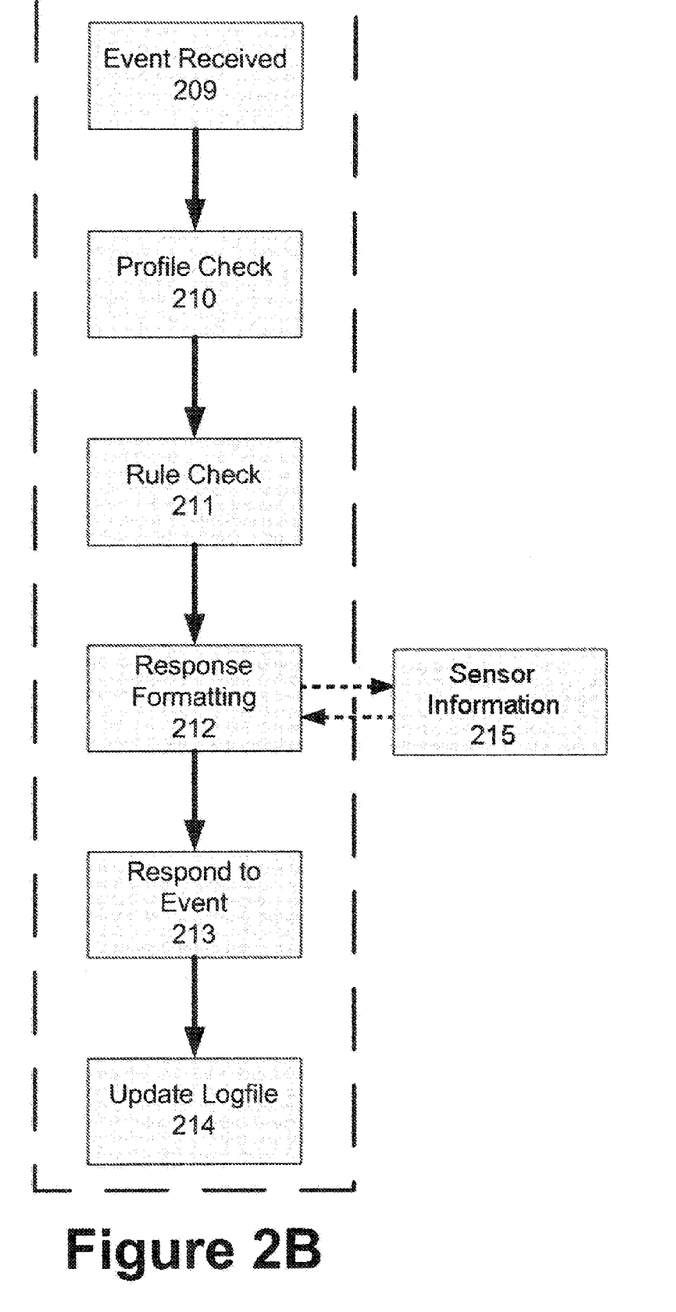
FIG. 2B shows the flow process of the system of FIG. 2A in accordance with the various aspects and teachings of the present invention.

Referring now to FIG. 2B, a process is shown for when the program, which includes code that is stored in memory, is executed. The process starts at step 209 with a triggering event being received in the system 100 of FIG. 1. The process continues to step 210 wherein a profile check is performed. At step 211, the system 100 examines the rules stored in the rules database 104 to determine the rules that are applicable to the triggering event. Based on the rules, at step 212, a response is formatted optionally using data obtained from one or more of the device's sensors 215 and at step 213 a response is provided to the triggering event. Thereafter, the profile is updated in the profile database 103 at step 214.

Figure 2C:
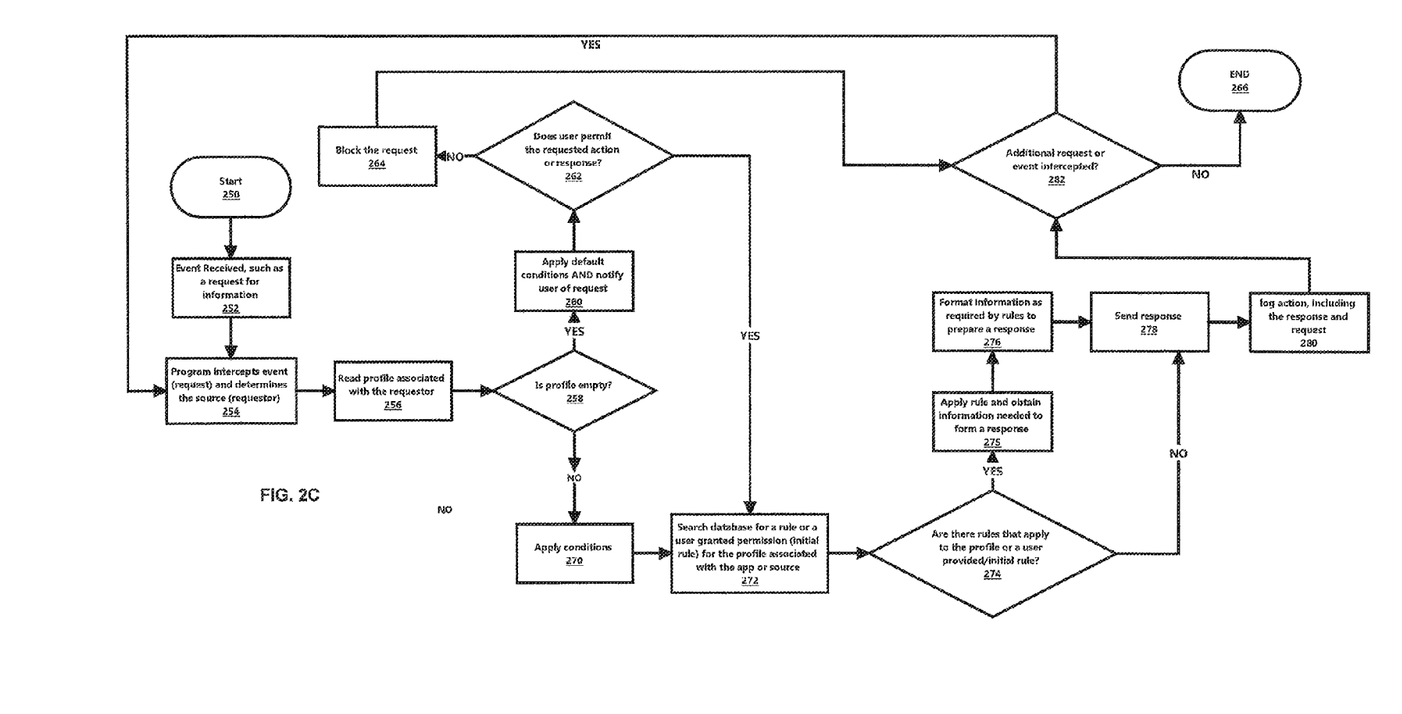
FIG. 2C shows a flowchart for the process of a system in accordance with the various aspects and teachings of the present invention.

Referring now to FIG. 2C, in accordance with one aspect and embodiment of the present invention, a process for providing a response is shown starting at step 250. A triggering event or an event, such as request is received at step 252. At step 254, the program or the app intercepts the request. The app determines the source of the request. At step 256, the app reads the profile associated with the source or requestor. At step 258, the app determines if the profile for the source is empty. If the profile is empty, then the process moves to step 260 and a default condition is applied. At step 262, the user is notified that a default condition exists and the user can determine or select if a request from a source is allowed to receive the requested information in the form of a response. If no, then the process moves to step 264 and the request is blocked. The process end at step 266 and response is not returned to the request from the app. At step 262, if the user does permit a response, then the process moves to step 272.

At step 258, if the profile is not empty, then the process moves to step 270 and the profile associated with the requestor is read and profile conditions are applied. At step 272, the app searches a database to find a rule associated with the profile. If no profile exists, then there may be not a rule association. In accordance with an aspect of the present invention, the user can provide an initial rule when there is not profile associated with the app or the source of the request. At step 274, the app determines if there are any rules to apply to the profile or if there is an initial rule provided by the user in the instant where there is no profile. If yes, then the process moves to step 275 and information needed to format a response is obtained. At step 276, the app formats the response in accordance with the various aspects outlined in Table 2. At step 278 the formatted response is sent to the source in response to the request that was intercepted at step 254. At step 280, the format of the response along with the request that triggered the event for formatting the response, are logged and stored. At step 282 the app determines if additional requests are intercepted. If yes, then the process returns to step 254 and determines the source of additional intercepted request. If no, then the process continues to step 266 and ends.

Figure 3A:
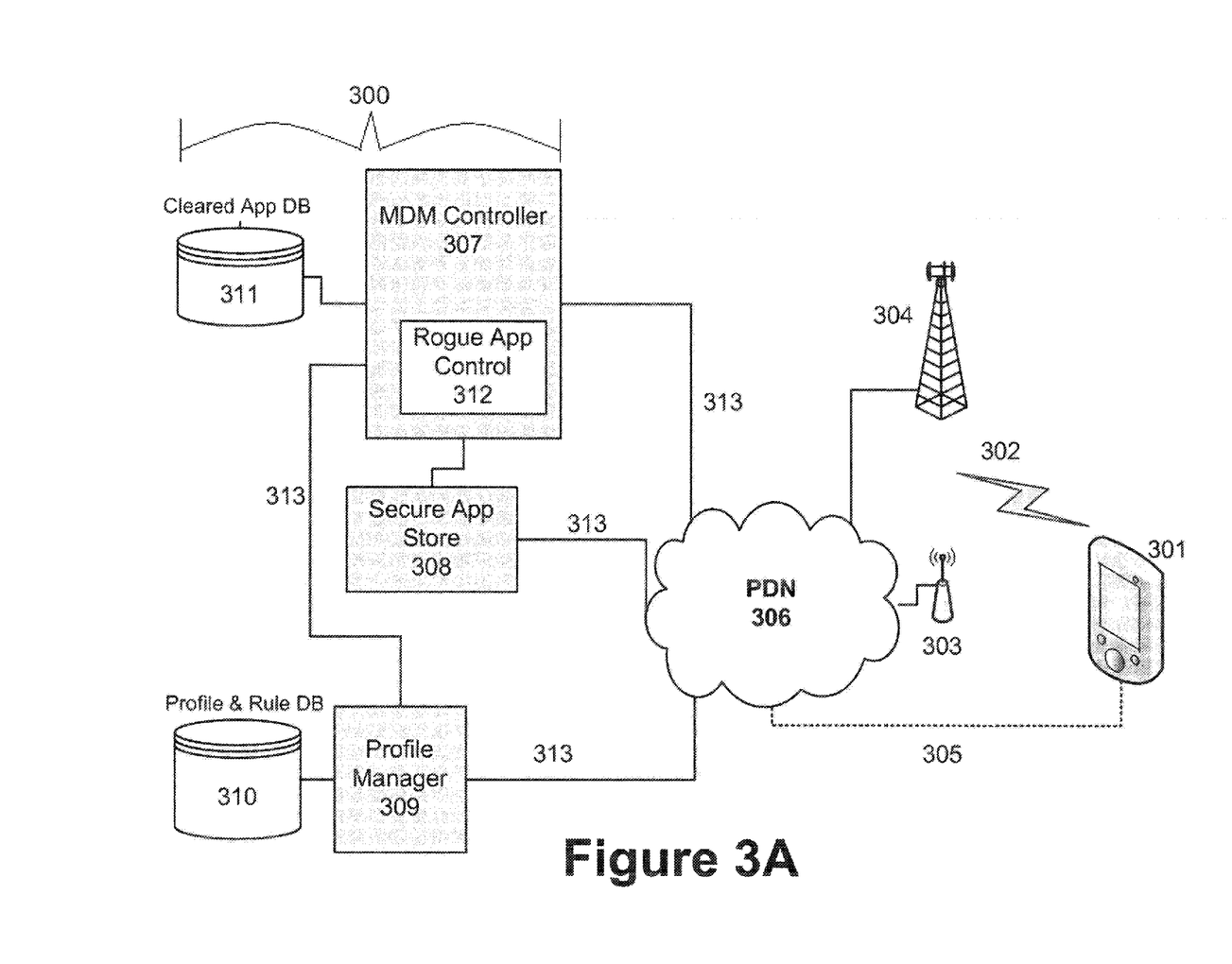
FIG. 3A shows a Mobile Device Management System implement access control on device applications in accordance with the various aspects and teachings of the present invention.
Figure 3B:
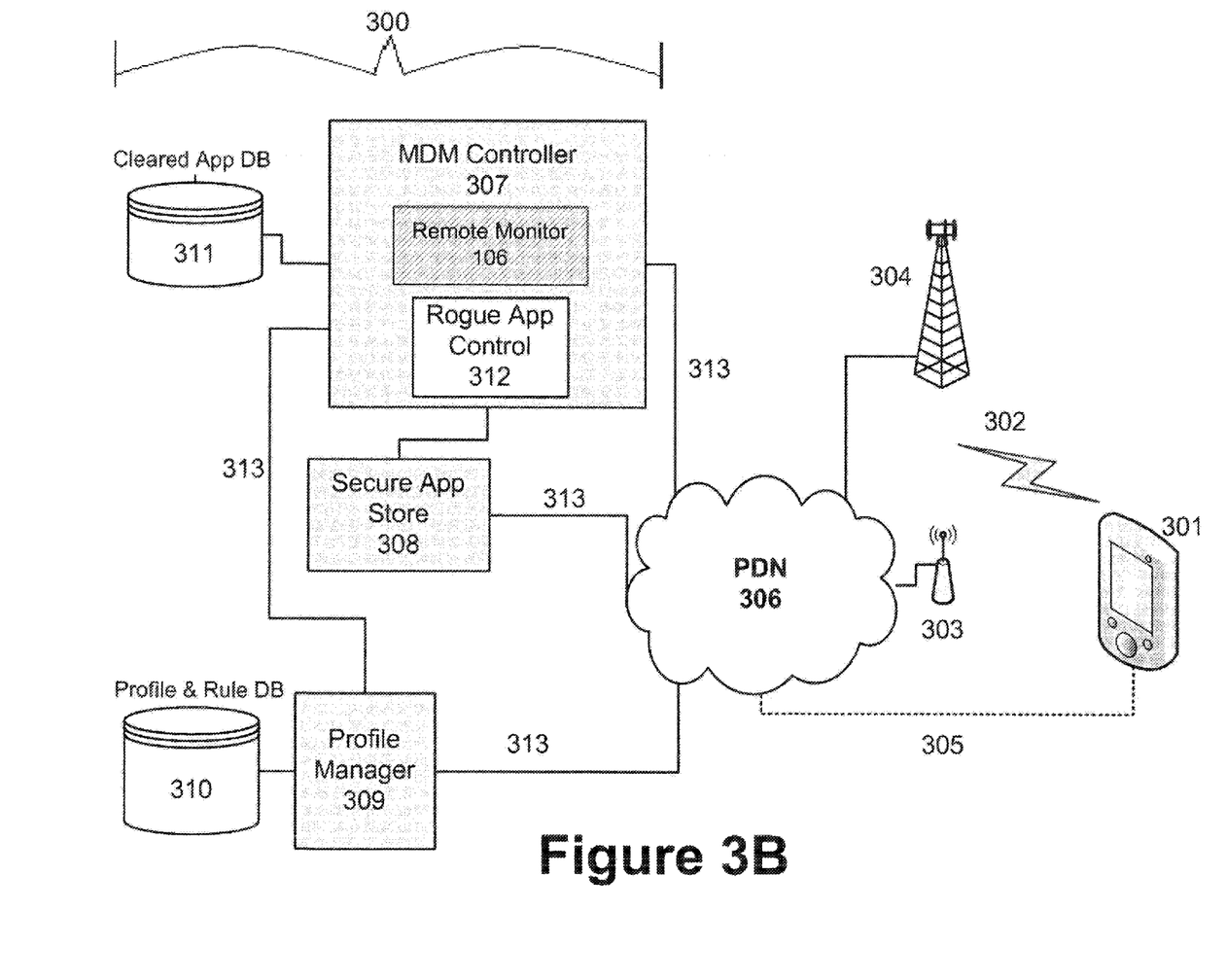
FIG. 3B shows the system of FIG. 3A with a remote monitor in accordance with the various aspects and teachings of the present invention.

Referring now to FIG. 3A and FIG. 3B and in accordance with the various aspects and embodiments of the present invention, a Mobile Device Management (MDM) controller 307 is shown as part of a networked system 300. In general, the MDM secures wireless devices by monitoring device usage including the installation of applications (apps) on the wireless device. The proliferation of devices, device type and bring-your-own-devices (BYOD) has made controlling usage, data costs and business risk problematic. The system 300 is designed with work with MDM systems. In accordance with one aspect and embodiment of the present invention, the remote interface is active while the local interface is disabled. In accordance with one aspect and embodiment of the present invention, the remote interface is inactive while the local interface is enabled. The loading and updating of the settings and rules databases is managed by the MDM while the notifications and logging are downloaded to the MDM.

Referring specifically to FIG. 3A, in accordance with various aspects and embodiments of the present invention, system 300 includes a mobile device 301 that has the program or application suite installed. The mobile device 301 communicates via a radio 302, a Wireless-Local-Area-Network (WLAN) 303, a Wide-Area-Network 304, and/or via a temporary tether 305. A Public Data Network (PDN) 306 provides interconnectivity between the mobile device 301 and the components of an MDM system 360. Generic data links 313 sized to handle expect traffic are used to connect the PDN 306 to the MDM controller 307, a secure app store 308 and a profile manager 309.

Referring again to FIG. 3A and FIG. 3B, in accordance with various aspects, the MDM controller 307 provides the device management functions that limit the applications that can be loaded on the phone or mobile device 301. A Rogue App Control Function module 312 is used to prevent uploading, side-loading, or activation of applications that have not been cleared. The module 312 may be implemented in hardware, software, or a combination thereof. In accordance with one aspect and embodiment of the present invention, the module 312 may be located in the mobile device 301 (not shown). A cleared application database 311 includes details on both secured applications and those found to be benign (e.g. not accessing user data or subsystems of interest like location, camera, or microphone).

The secure app store 308 includes downloadable applications that are benign or de-fanged before being offered. De-fanged applications are those either known to be controllable by the system 360 or rewritten to conform to organizational security standards and rules of the system 360.

A profile manager 309 includes an entry for every device, every user, and every application under control of the system 360. Individualized access control settings are maintained in the profile database 310 and are uploaded as needed. The Profile Manager also downloads logfiles from the device-based application(s) storing them for later analysis and auditing.

Figure 4:
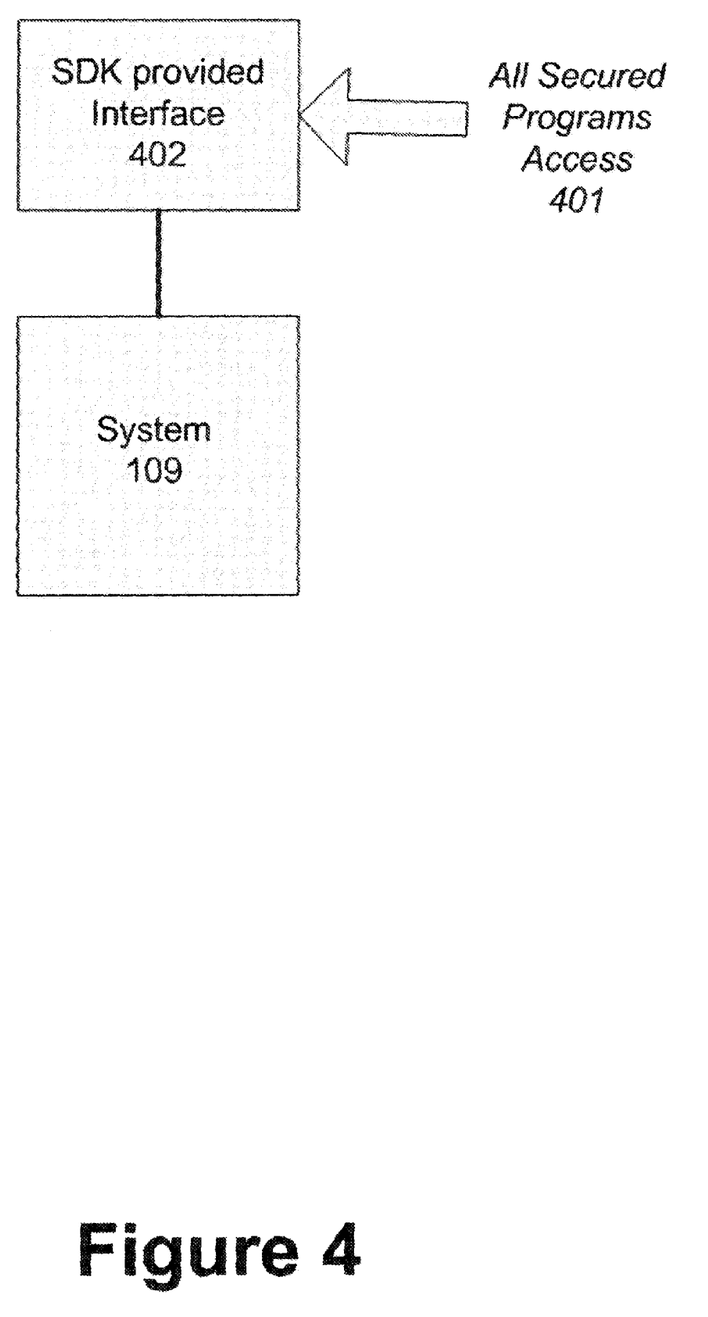
FIG. 4 shows a custom software development kit used to implement access control on device applications in accordance with the various aspects and teachings of the present invention.

In accordance with various aspects and embodiments of the present invention, one method for de-fanging device applications is use of the SDK. Referring now to FIG. 4, the SDK provides a unique access portal 401 via an SDK described API interface 402 for all programs to be secured. Wrapped with the SDK, the secured application then operates using the access provided and, thus, the profile and rules of the regular system 100 of FIG. 1.

Figure 5:
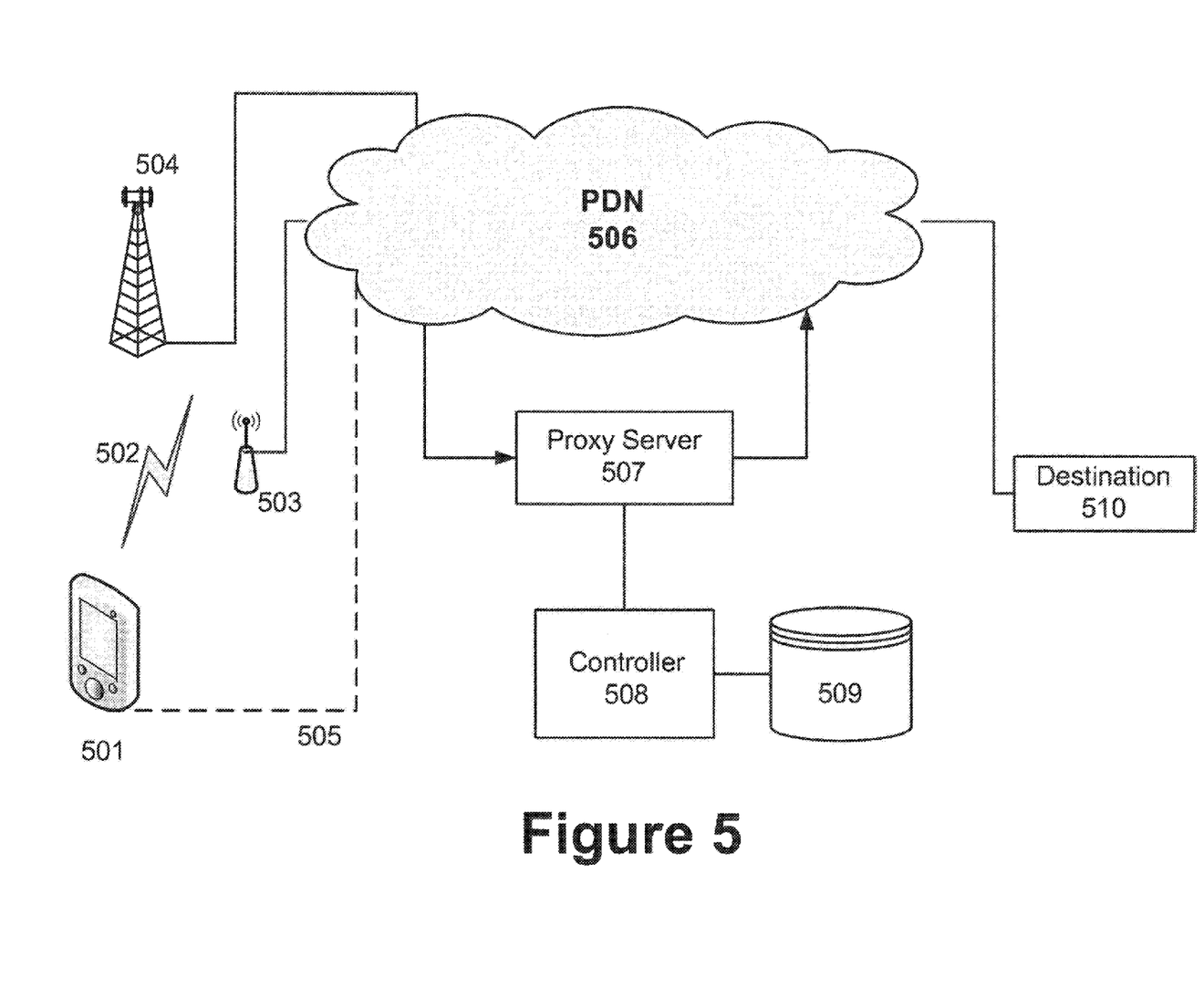
FIG. 5 shows use of a proxy server to implement access control on device applications in accordance with the various aspects and teachings of the present invention.

In accordance with other various aspects of the present invention, a method for de-fanging device applications is use of a proxy. Referring now to FIG. 5, a mobile device 501 communicates via radio 502 to a WLAN 503 or cellular data network 504. The mobile device 501 may also use a wired tether 505 with the general. The mobile device 501 communicated through a PDN 506. All or selected portions of the data produced by the mobile device 501 is routed to a proxy server 507. A controller 508 analyzes the data for personal or other secured information. Also, destination address field information is scrutinized for known malicious addresses and to log a destination of potential raiders of secured data. Secured data is stripped from the data stream and, in accordance with various aspects of the system, replaced or modified (according to a setting database 509) by the controller 508. Once processed the data is re-addressed by the proxy server 507, then routed over the PDN 506 to its original destination address 510.

Some operating systems for mobile devices (notably ANDROID) provide a test location function that may be used for location security.

The system, which is based on the various aspects and embodiments of the present invention, upon detecting activation of a known malicious program or a rogue access of location, could use the test location function to write a default, dithered, or spoofed location in place of the actual location, preventing secure data, in this case location, from being absconded. Similar functionality for each service could be used to deny or spoof raids of personal data and services such as video, microphone or that developed by other onboard sensors.

With mobile devices increasing in processing power and multi-core processors being widely deployed in mobile devices, use of processing power on-board to recognize the activation of a secure subsystem or loading of secured data can be accomplished.

In accordance with various aspects and embodiments of the present invention, the Chipset concept is the creation of instructions that can be loaded into chipset, thereby removing the need to have software residing on the OS. While this implementation is unique the on-chip approach mirrors that done with firmware resident device drivers. In its simplest form, the on-chip implementation would be used to verify that code is actually running.

Included in the chipset embedded instructions are all application management capabilities and logical operations of the system. The chipset approach is especially useful those operations that are processor or power intensive like deep packet inspection, heuristic forecasting and inference building. Since these embedded instructions/capabilities could be accessed directly without the OS permissions potentially allowing the carrier control of device security and leakage.

The chipset concept gives the user (or device owner) fine control over all information "leaking" from mobile device through a manageable UI. Ideally, this capability can be accomplished through direct interaction with the arbitration program removing the OS from its exclusive control over data access/leakage. Such a capability would put the user in a more powerful position vis-a-vis the OS, App provider, carrier and OEM.

In accordance with some aspects and embodiments of the present invention, a processor may be a central processing unit (CPU) and has the ability to monitor all onboard radios and sensors: GPS, Bluetooth, RFID, accelerometer, camera, NFC, etc. Location Sentry chip instructions will monitor all sensors and have the ability to conduct statistical analyses of the data requests emanating from outside the device and from the OS to determine suspicious patterns from which it is possible to infer that malware, Trojans or viruses have seized control of the mobile device and requesting private data or an App or the operating system is leaking data. This can be accomplished directly through monitoring hardware sensors and radios or indirectly through sensor activation, monitoring power usage or RF transmission.

In accordance with one aspect or embodiment, a direct hardware-level API will be implemented to by-pass the OS and any malware type programs. The direct API interface will work similar to the existing Intel In-target Probe (ITP), The ITP is a device used in computer hardware and microprocessor design, to control a target microprocessor or similar ASIC at the register level. It generally allows full control of the target device and allows the computer engineer access to individual processor registers, program counter, and instructions within the device. It allows the processor to be single-stepped or for breakpoints to be set. Unlike an in-circuit emulator (ICE), an In-Target Probe uses the target device to execute, rather than substituting for the target device.

The UI that is in accordance with the numerous features and aspects of the present invention, such as the UI 105, has the ability to display and give appropriate user control over information leakage. First notifying the user that specific information is leaking. Second, give user fine control over which Apps, what time, and who is to access their private information, and where that data is allowed to leak in a user friendly, lightweight and manageable approach.

The chipset implantation has a software arbitration program that will bridge hardware and OS. Monitoring sensors is not enough as the OS creates, stores, and disseminates data apart from the hardware, allowing for malware applications or viruses access to or the ability to create, alter, or delete data. If implemented at the chipset level, the system becomes the ultimate failsafe backstop to other security software.

A. Additional Embodiments

Application Specific Sensing, Reading and Monitoring Capabilities

As previously described, the intelligent agent program (aka 'sentry' or 'Sentry Program') may include Application specific sensing, reading and monitoring capabilities. For instance in one embodiment, a library which can be configured to look for associated exceptions/excursions from a list of configurable parameters which are coded into the profile for each individual application (App) and operating system process.

The list of parameters may include but are not limited to application run-time characteristics shown in Table 3. Application sizes, parameters, permissions, are uploaded from the remote monitor or may accompany the Sentry Program on first or subsequent uploads to the device:

TABLE 3

App size (bytes)
App memory usage (pre-set threshold value, rate of increase, out-of-bounds with historical operation)
Application date, size, or issue violation
Packet size
CRC violation
CRC encrypted algorithm variable packet length violation
Application permissions changed during operation
Application permissions changed from prior edition On a detected operation or threshold violation the sentry application can notify the remote monitor. The remote monitor may be configured to signal outside entities either for a single detected event in a targeted mobile device population, or may aggregate event report over any set or subset of the serviced population of sentry-protected mobile devices.

In one illustrative implementation example; the sentry program monitors just the behavior of a targeted app for security purposes—the sentry program is a software entity separate and apart from the O/S, phone manufacturer, or user behavior and knowledge. This embedded set of libraries looks for malicious code insertion, behavior outside of design parameters and sends a message to app developer/corporation allowing them to shut down or reload app. This signaling from the mobile device would take place via the remote monitor.

In another illustrative implementation example; the remote monitor may also, as an additional feature, create forensic reports of app behavior to document data ex filtration behavior to provide documentation to defend against class action suits or regulatory fines or violations. Again, The remote monitor may be configured to compile the forensic report either for a single detected event in a targeted mobile device population, or may aggregate event report over any set or subset of the serviced population of sentry-protected mobile devices.

Passive vs. Active Operation

Using either locally stored rules or on command of the remote monitor, the Sentry Program can be preconfigured or instructed to execute a routine that will cause the Sentry to do any number of preconfigured actions in combination. These actions may include.

Message the remote monitor of the offense

Message the device UI (if present) with details of the offence

Cause the app to individually, regionally or globally shutdown, exit, delete, download a new release.

Query the user via UI or via the remote monitor if action is warranted (recommendations are possible given the nature of the offense). The query may be a notification by email, text, and or popup to the mobile device UI dependent on the capabilities of the device.

User Alert Messages may include: User initiated mandatory/recommended actions, including time sensitive actions (Action must be completed within a specific time or a self-initiated mandatory action will occur).

In one illustrative implementation example; the sentry and accompanying infrastructure act as in an "On-duty" protective mode. The "On-Duty" mode is a preconfigured operational mode of the sentry, whereupon activation the sentry over-rides the ability of other apps to use device resources (e.g. CPU, battery, storage, sensors, use various radios to receive or transmit data etc.). The sentry in on-duty mode would prevent non-selected apps from running in the background or at least connecting to the device services such as network memory and sensors. The "On-Duty" mode functionality may prioritize specified functions that are "duty related" and excludes all other apps from running, e.g. using mobile device resources including memory, processor time, and radio resources (transmitting data, etc). Additionally, the sentry will capture forensic info and be able to positively verify what apps used what resources and what resources were blocked from being used. The described sentry functionality may be used to verify that whitelisted or 'approved' applications ('apps') are sending data only to whitelisted (known good) locations, addresses, etc. and behaving in an approved and expected manner as configured in the rules database.

Activation of the sentry program will be involuntary for the user. In other words, the user will not be able to deactivate the sentry while they are on duty. Activation of the sentry app will be triggered by any of a number of actions—for example, direct implementation by an administrator, the passage of time (e.g. 8 am), connection with a RF network, crossing a Geo-fence, etc. as configured in the profile and rules database.

On one implementation, the sentry will report to the remote/central server app behavior, creating a data flow analytics platform that allows inspection of aggregate and individual app behavior of any set or subset of the sentry-equipped mobile device population.

The true scope of the present invention is not limited to the presently preferred embodiments disclosed herein and indeed could be applied to any reprogrammable remote sensing or other computing device that creates, saves and transmits information that a user or owner could consider sensitive. For example, the foregoing disclosure of a presently preferred embodiment of the system uses explanatory terms, such as mobile device, API, MDM Controller, Secure App Store and the Profile Manager and the like, which should not be construed so as to limit the scope of protection of the following claims, or to otherwise imply that the inventive aspects of the system are limited to the particular methods and apparatus disclosed. Moreover, as will be understood by those skilled in the art, many of the inventive aspects disclosed herein are based on software applications and operating systems running on generic hardware processing platforms. These functional entities are, in essence, programmable data collection, analysis, and storage devices that could take a variety of forms without departing from the inventive concepts disclosed herein. Given the rapidly declining cost and power usage of processors, multi-core processors and other processing hardware, it is easily possible, for example, to combine the MDM Controller, the Secure App Store and the Profile Manager without changing the inventive operation of the system. In many cases, the place of implementation (i.e., the functional element) described herein is merely a designer's preference and not a hard requirement. Accordingly, except as they may be expressly so limited, the scope of protection of the following claims is not intended to be limited to the specific embodiments described above. Thus, the embodiments described herein can include various combinations and/or sub-combinations of the functions, components and/or features of the different embodiments described. For example, multiple, distributed qualification processing systems can be configured to operate in parallel. Additionally, reference to a server may include one computer with one processor or multiple computers working in a cluster.

It is noted that, as used in this description, the singular forms "a," "an" and "the" include plural referents unless the context clearly dictates otherwise. Reference throughout this specification to "one aspect," "another aspect," "one embodiment," "an embodiment," "certain embodiment," or similar language means that a particular aspect, feature, structure, or characteristic described in connection with the embodiment is included in at least one embodiment of the present invention. Thus, appearances of the phrases "in one embodiment," "in at least one embodiment," "in an embodiment," "in certain embodiments," and similar language throughout this specification may, but do not necessarily, all refer to the same embodiment.

It will be apparent that various aspects of the present invention as related to certain embodiments may be implemented in software, hardware, application logic, or a combination of software, hardware, and application logic. The software, application logic and/or hardware may reside on a server, an electronic device, or be a service. If desired, part of the software, application logic and/or hardware may reside on an electronic device and part of the software, application logic and/or hardware may reside on a remote location, such as server.

In accordance with the teaching of the present invention and certain embodiments, a program or code may be noted as running on a computing device. A computing device is an article of manufacture. Examples of an article of manufacture include: a server, a mainframe computer, a mobile telephone, a multimedia-enabled smartphone, a tablet computer, a personal digital assistant, a personal computer, a laptop, or other special purpose computer each having one or more processors (e.g., a Central Processing Unit, a Graphical Processing Unit, or a microprocessor) that is configured to execute a computer readable program code (e.g., an algorithm, hardware, firmware, and/or software) to receive data, transmit data, store data, or perform methods. The article of manufacture (e.g., computing device) includes a non-transitory computer readable medium having a series of instructions, such as computer readable program steps encoded therein. In certain embodiments, the non-transitory computer readable medium includes one or more data repositories. The non-transitory computer readable medium includes corresponding computer readable program code and may include one or more data repositories. Processors access the computer readable program code encoded on the corresponding non-transitory computer readable mediums and execute one or more corresponding instructions.

Other hardware and software components and structures are also contemplated. Unless defined otherwise, all technical and scientific terms used herein have the same meaning as commonly understood by one of ordinary skill in the art to which this invention belongs. Although any methods and materials similar or equivalent to those described herein can also be used in the practice or testing of the present invention, representative illustrative methods and materials are now described.

All publications and patents cited in this specification are herein incorporated by reference as if each individual publication or patent were specifically and individually indicated to be incorporated by reference and are incorporated herein by reference to disclose and describe the methods and/or system in connection with which the publications are cited. The citation of any publication is for its disclosure prior to the filing date and should not be construed as an admission that the present invention is not entitled to antedate such publication by virtue of prior invention. Further, the dates of publication provided may be different from the actual publication dates which may need to be independently confirmed.

All statements herein reciting principles, aspects, and embodiments of the invention as well as specific examples thereof, are intended to encompass both structural and functional equivalents thereof. Additionally, it is intended that such equivalents include both currently known equivalents and equivalents developed in the future, i.e., any elements developed that perform the same function, regardless of structure. The scope of the present invention, therefore, is not intended to be limited to the exemplary embodiments shown and described herein. Rather, the scope and spirit of present invention is embodied by the appended claims.

What is claimed is:

1. An apparatus comprising:
   at least one processor; and
   at least one memory coupled to the at least one processor, the memory including an intelligent computer program that, when executed by the at least one processor, directs the apparatus to:
   monitor information accessed by at least one application, which is downloaded to the apparatus, according to a user's selection of access rights to information for the at least one application running on the apparatus;
   collect, as defined by the user, the selection of the access rights to information for the at least one application;
   send the collected access rights to a remote database to build a profile for the at least one application;
   receiving the profile for the at least one application by a control program running on the apparatus;
   monitor, using a control program stored in the memory of the apparatus, for new access rights to information associated with the at least one application;
   determine if the new access rights to information associated with the at least one application is consistent with the profile for the at least one application; and
   control, using the control program, the at least one application based on comparison of the new access rights with the profile.

2. The apparatus of claim 1, wherein the intelligent computer program includes instructions that further direct the apparatus to send a message to at least one of: the user of the apparatus and a remote administrator of the control program.

3. The apparatus of claim 2, wherein the message is an alert that the at least one application's new access rights is incompatible with the profile in order to request control instructions from at least one the user and the remote administrator of the control program.

4. The apparatus of claim 1, wherein if the new access rights is not consistent with the profile, then directing the apparatus to reload the at least one application.

5. The apparatus of claim 1, wherein if the new access rights is not consistent with the profile, then directing the apparatus to shut down the at least one application.

6. The apparatus of claim 1, wherein if the new access rights is not consistent with the profile, then directing the apparatus to send the new access rights to the remote database to update the profile.

7. The apparatus of claim 1, wherein the information includes at least one of application size, destination permissions for communication, and application protocols.

8. An apparatus comprising:
   at least one processor; and
   at least one memory coupled to the at least one processor, the memory including an intelligent computer program that, when executed by the at least one processor, directs the apparatus to:
   monitor for a triggering event associated with the apparatus;
   based on the triggering event, control at least one application running on the apparatus using a control program after the at least one application is downloaded to the apparatus;
   collect a selection of at least one access right selected by a user from a plurality of access rights to information accessed by the at least one application in response to the triggering event;
   send the collected selection of the at least one access right to a remote database to build a behavior profile for the at least one application in response to the triggering event;
   monitor, using a control program stored in the memory of the apparatus, for new access rights to information associated with the at least one application;
   determine whether the new access rights to information associated with the at least one application is consistent with the profile for the at least one application; and
   control, using the control program, the at least one application based on comparison of the new access rights with the profile.

9. The apparatus of claim 8, wherein the triggering event is at least one event from a group of triggering events that includes: location of the apparatus, speed of movement of the apparatus, time, status of the apparatus, use of the at least one application, accessing the at least one application, and predetermined rules for control of access to the apparatus.

10. The apparatus of claim 8, wherein the trigger event is arriving at work and the memory includes computer program that, when executed by the at least one processor, causes the apparatus to perform at least one of: limit use of the apparatus resources by other applications, limit the ability of transmission by the other applications from the apparatus, and deactivate at least one sensor of the apparatus.

11. The apparatus of claim 8, wherein the memory includes computer program that, when executed by the at least one processor, causes the apparatus to encrypt meta data gathered by the at least one application and the meta data includes at least one of: speed and movement of travel, time of day, contacts, call logs, and proximity of other apparatus.

12. The apparatus of claim 8, wherein the control program causes the apparatus to further prevent sharing of meta data from the at least one application with other applications stored on the apparatus when the at least one application is not active.

13. A system comprising:
a device, including memory and a processor, wherein the device collects a selection, by a user, of at least one access right chosen by a user of the device from a plurality of access rights to information for at least one application running on the device, wherein a control program stored in the memory of the device, when executed by the processor, is configured for:
monitoring new access rights to information associated with the application;
determining whether the new access rights to information associated with the application is consistent with the profile for the application; and
control, the application based on comparison of the new access rights with the profile; and a server in communication with the device, wherein the server receives the collected selection of the at least one access right from the device, stores the collected selection of the at least one access right in a database to build a behavior profile for the at least one application.

14. The system of claim 13, wherein the server controls the at least one application based on comparison of the future access rights to information with the behavior profile.

15. The system of claim 13, wherein the server sends a control signal to the device allowing the device to control, using a control program running on the device, the at least one application based on comparison of the future access rights to information with the behavior profile.

16. The system of claim 13, wherein the device monitors, using a control program, for a trigger event and the device sends a trigger signal to the server when the trigger event is detected.

17. The system of claim 16, wherein the trigger event is at least one event selected from the group including: location of the device, speed of movement of the device, time, status of device, accessing the at least one application, and predetermined rules for control of the at least one application's access to the device.

* * * * *